(No Model.)
J. H. GIBSON.
HORSE CHECKING DEVICE.
No. 493,888. Patented Mar. 21, 1893.
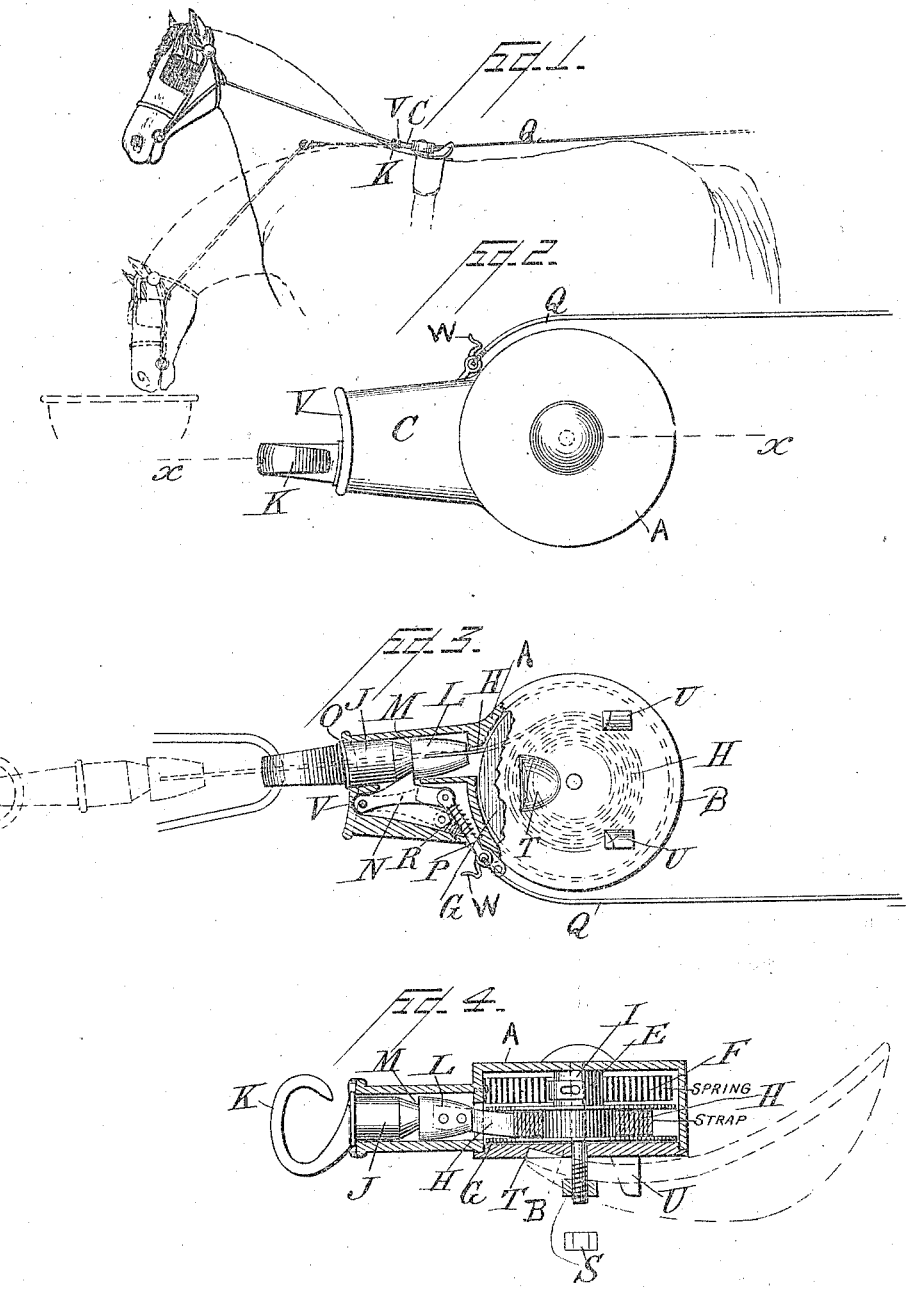
Attest:
F. H. Schott
Alfred T. Gage
Inventor
John H. Gibson,
by W. Henderson
Attorney

United States Patent Office.

JOHN HARVEY GIBSON, OF BRUIN, PENNSYLVANIA.

HORSE-CHECKING DEVICE.

SPECIFICATION forming part of Letters Patent No. 493,888, dated March 21, 1893.

Application filed June 4, 1892. Serial No. 435,537. (No model.)

*To all whom it may concern:*

Be it known that I, JOHN HARVEY GIBSON, a citizen of the United States, residing at Bruin, in the county of Butler and State of Pennsylvania, have invented certain new and useful improvements in Checking Devices; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to devices for reining horses so that the check or bridle rein will be normally held taut so that the horse's head will be reined up and yet when it is desired to permit the horse to lower his head for drinking or other purposes it can be done without the necessity of the driver leaving his seat in the vehicle to unhook the check rein, the construction also being designed to automatically draw back the check rein after the horse has been watered.

The object of the invention is to provide simple and efficient means for the purposes stated, and the invention consists in the construction and combination of parts hereinafter particularly described and then sought to be specifically defined by the claims, reference being had to the accompanying drawings forming a part hereof and in which, Figure 1 is a side elevation representing a horse bridled and having the checking device attached to the harness saddle, the dotted lines representing the position when the horse's head is lowered. Fig. 2 is a top plan view of the checking device. Fig. 3 is a bottom plan view of the same partly in section and showing in dotted lines the check-rein hook when withdrawn from its casing; and Fig. 4 is a vertical cross section on the line $x$—$x$ of Fig. 2, representing the harness saddle in dotted lines.

In the drawings the letter A designates the casing of any desired configuration and preferably made in two parts by having the bottom plate B made separable from the other parts for the introduction and removal of the operating parts. This casing is formed with a lateral extension C to receive within the same the shank of the check-rein hook and the holding pawl, the chamber preferably being divided into two parts by the partition D so that the shank of the check-rein hook will lie in one compartment, and the pawl will lie in the other, the partition having an opening formed for the passage of the engaging end of the pawl so that it may engage the shank of the check-rein hook.

Within the main part of the casing is rotatably secured a drum E which may be of varying diameter as illustrated, or otherwise, to which drum is secured one end of a coil spring F, the other end of said spring being attached to the casing or shell as illustrated. This drum also carries two flanges G separated from each other which will serve to secure within the limits between the flanges the strap H and to prevent said strap from becoming entangled with the spring and from rubbing against the face of the casing or shell. The journal of the drum E may be the bolt I which passes through the casing and serves to hold the two parts thereof together as well as to afford the means for attachment of the reiner to the harness saddle. The strap H is secured at one end to the drum E and at the other end to the shank J of the check-rein hook K. It is preferred to make the inner end of the shank J of tapering form as illustrated at L so as to facilitate the entering of the same into the cavity or compartment formed for the shank in the shell as it is obvious that when the shank is out of the casing and is being drawn back into the same if the end of the shank strikes the wall of the opening for the shank the latter owing to its tapering form will be drawn quickly into line with the opening so that it may easily and quickly adjust itself therein. The shank J is formed between its ends with a shoulder M, preferably made by reducing the thickness of the shank at that point, so that the shoulder may be engaged by a pawl N to hold the shank in place and prevent the check-rein being slackened or drawn out except when desired by the driver. The shank J is also provided with a collar or shoulder O designed to bear against the outer face of the extension C so as to close the mouth of the opening or chamber in which the check hook shank fits and to limit the inward movement of that shank.

The pawl N is pivoted in the chamber of extension C in such position that its point or end which normally projects through the partition that divides the chamber into two compartments will engage the shoulder M of the check hook shank and hold it in its locked position. To the inner end of this pawl there is pivotally connected one end of a pin or link P the other end of which projects through an opening in the wall of the extension C and is connected to a strap Q which will extend back to the vehicle and be within easy reach of the driver so that when the check rein is to be loosened the driver will pull upon the strap Q which will disengage the pawl from the shoulder on the check hook shank and allow the check hook to be drawn outward. The link P may also have formed on its outer end the V-shaped projection W into which the knot or cracker at the end of a whip may be laid and by drawing backward upon the whip the link will be withdrawn to release the shank J and allow the strap H to uncoil instead of drawing on the strap Q. The projection W may be used with or without the strap Q. As soon as the shoulder M has passed the pawl a coil spring R around the link P will throw the pawl into its normal position to engage the shoulder of the check-hook shank when the same is drawn back into place through the instrumentality of the strap H and the spring F located within the casing or shell.

The shell or casing will be secured to the harness saddle by means of the bolt I which will be passed through the saddle say at the point where the hook is ordinarily attached to the saddle and a nut S screwed onto the end of that bolt will hold the shell or casing to the saddle. The bottom plate of the shell is formed with a notch or cavity T designed to receive the forward end of the harness saddle and is also formed with the projections or studs U which will bear against the top of the saddle or enter cavities or depressions made in the saddle for them so as to steady and brace the shell or casing in its position on the saddle. Or the bottom plate of the casing may be cast integral with the saddle and the casing secured thereto. It is also preferred to make the face end of the extension C concave crosswise as indicated at V in Figs. 2 and 3 so that the incline of the concavity will assist in directing the check hook shank into its opening if when withdrawn it should be turned or pulled to one side and its end strike against said concave face in being drawn back into the casing.

Under the construction described a very simple and efficient checking device is provided in which the parts are not liable to get out of repair or be displaced to be rendered inoperative, and which can be applied quickly and without skill to harness saddles already in use. The parts can also be manufactured at comparatively little expense, and being strong and efficient overcome the objections found with many other forms of reiners heretofore in use.

The checking device may be constructed of any suitable material, but is preferably formed of metal and may be japanned or otherwise ornamented.

Having described my invention and set forth its merits, what I claim is—

1. In a checking device the combination with the shell or casing containing the strap and spring and having a lateral extension of the check-rein hook having its shank located within said extension and connected to said strap and formed with the shoulder between its ends, the pawl pivotally supported within the extension C along side the check-hook shank with its engaging portion normally raised to engage the shoulder on the hook shank and adapted to be depressed by the inward movement of the shank, and a spring acting on said pawl to normally hold it in its raised position, substantially as and for the purposes described.

2. The combination with the shell containing the strap and spring, of the check-hook shank having a tapering end and provided with a shoulder located outside of the casing to limit the inward movement of the shank and a second shoulder between said first named shoulder and the inner end of the shank, a pivoted pawl located to engage the second shoulder of the check-hook shank, the link pivoted to said pawl and having connected to it a strap adapted to extend backward to the vehicle, and a spring acting on said pawl and link to restore them to their normal position, substantially as and for the purposes described.

3. In a checking device, the combination with the check-hook shank, a strap connected thereto and pawl adapted to secure said shank and a spring for retracting said shank and strap, of a shell or casing inclosing said parts and having formed on its lower face a recess to receive the end of the harness saddle and projections or lugs to bear against said saddle, to steady and brace the shell or casing on the saddle, and means for securing the casing to the saddle, substantially as and for the purposes described.

In testimony whereof I affix my signature in presence of two witnesses.

JOHN HARVEY GIBSON.

Witnesses:
L. E. KELLY,
R. P. DOMBENSPECK.